US008570296B2

(12) United States Patent
Birnbaum et al.

(10) Patent No.: US 8,570,296 B2
(45) Date of Patent: Oct. 29, 2013

(54) SYSTEM AND METHOD FOR DISPLAY OF MULTIPLE DATA CHANNELS ON A SINGLE HAPTIC DISPLAY

(75) Inventors: David Birnbaum, Oakland, CA (US); Chris Ullrich, Ventura, CA (US); Jason Short, San Francisco, CA (US); Ryan Devenish, San Francisco, CA (US)

(73) Assignee: Immersion Corporation, San Jose, CA (US)

( * ) Notice: Subject to any disclaimer, the term of this patent is extended or adjusted under 35 U.S.C. 154(b) by 0 days.

(21) Appl. No.: 13/472,713

(22) Filed: May 16, 2012

(65) Prior Publication Data

US 2012/0229401 A1 Sep. 13, 2012

(51) Int. Cl.
*G06F 3/041* (2006.01)

(52) U.S. Cl.
USPC ........................................ 345/173; 340/407.2

(58) Field of Classification Search
USPC .................... 345/156–184; 178/18.01–18.09; 340/4.12, 407.1, 407.2; 463/30
See application file for complete search history.

(56) References Cited

U.S. PATENT DOCUMENTS 5,666,499 A 9/1997 Baudel et al.
5,825,308 A 10/1998 Rosenberg
6,061,004 A 5/2000 Rosenberg
6,088,019 A 7/2000 Rosenberg
6,100,874 A 8/2000 Schena et al.
6,166,723 A 12/2000 Schena et al.
6,211,861 B1 4/2001 Rosenberg et al.
6,252,579 B1 6/2001 Rosenberg et al.
6,300,936 B1 10/2001 Braun et al.
6,337,678 B1 1/2002 Fish
6,429,846 B2 8/2002 Rosenberg et al.
6,448,977 B1 9/2002 Braun et al.
6,647,359 B1 * 11/2003 Verplank et al. .................. 703/2
6,717,573 B1 4/2004 Shahoian et al.
6,819,312 B2 11/2004 Fish
7,024,625 B2 4/2006 Shalit (Continued)

FOREIGN PATENT DOCUMENTS

DE 200 19 074 2/2001
EP 0 899 650 3/1999
EP 1 691 263 11/2003
EP 1 401 185 3/2004
EP 1 731 993 12/2006
FR 2 910 160 6/2008
GB 2 416 962 2/2006
WO WO 97/20305 6/1997

(Continued)

OTHER PUBLICATIONS

Biet, M. et al., Discrimination of Virtual Square Gratings by Dynamic Touch on Friction Based Tactile Displays, Haptic Interfaces for Virtual Environment and Teleoperator Systems, 2008, Symposium, IEEE, Piscataway, NJ, XP 031339918, pp. 41-48, Mar. 2008. ISBN: 978-1-4244-2005-6.

(Continued)

*Primary Examiner* — Dmitriy Bolotin
(74) *Attorney, Agent, or Firm* — Thomas A. Hassing

(57) ABSTRACT

A system that produces a haptic effect and generates a drive signal that includes at least two haptic effect signals each having a priority level. The haptic effect is a combination of the haptic effect signals and priority levels. The haptic effect may optionally be a combination of the two haptic effect signals if the priority levels are the same, otherwise only the haptic effect signal with the highest priority is used. The frequency of haptic notifications may also be used to generate a drive signal using foreground and background haptic effect channels depending on whether the frequency ratio exceeds a foreground haptic effect threshold.

12 Claims, 10 Drawing Sheets

(56) References Cited

U.S. PATENT DOCUMENTS 7,084,854 B1 8/2006 Moore et al.
7,088,342 B2 8/2006 Rekimoto et al.
7,133,177 B2 11/2006 Tamaru
7,205,978 B2 4/2007 Poupyrev et al.
7,336,260 B2 2/2008 Martin et al.
7,446,456 B2 11/2008 Maruyama et al.
7,456,823 B2 11/2008 Poupyrev et al.
7,468,573 B2 12/2008 Dai et al.
7,528,508 B2 5/2009 Bruwer
7,554,246 B2 6/2009 Maruyama et al.
7,592,999 B2 9/2009 Rosenberg et al.
7,663,604 B2 2/2010 Maruyama et al.
7,755,607 B2 7/2010 Poupyrev et al.
7,765,333 B2 * 7/2010 Cruz-Hernandez et al. ...... 710/5
7,808,488 B2 10/2010 Martin et al.
7,821,498 B2 10/2010 Kramer et al.
7,825,903 B2 11/2010 Anastas et al.
RE42,064 E 1/2011 Fish
7,890,863 B2 2/2011 Grant et al.
7,920,131 B2 4/2011 Westerman
7,924,144 B2 4/2011 Makinen et al.
7,969,288 B2 6/2011 Braun et al.
7,973,769 B2 7/2011 Olien
7,978,181 B2 7/2011 Westerman
7,979,146 B2 * 7/2011 Ullrich et al. .................. 700/94
7,982,588 B2 7/2011 Makinen et al.
7,982,720 B2 7/2011 Rosenberg et al.
8,004,492 B2 8/2011 Kramer et al.
8,031,181 B2 10/2011 Rosenberg et al.
8,035,623 B2 10/2011 Bruwer
8,059,105 B2 11/2011 Rosenberg et al.
8,098,235 B2 1/2012 Heubel et al.
8,141,947 B2 * 3/2012 Nathan et al. .............. 297/217.3
8,260,972 B2 * 9/2012 Cruz-Hernandez et al. ...... 710/5
8,279,193 B1 * 10/2012 Birnbaum et al. ............ 345/173
2001/0035854 A1 11/2001 Rosenberg et al.
2002/0044132 A1 4/2002 Fish
2002/0177471 A1 11/2002 Kaaresoja et al.
2003/0063128 A1 4/2003 Salmimaa et al.
2003/0100969 A1 5/2003 Jones
2003/0162595 A1 8/2003 Serbanescu
2003/0206202 A1 11/2003 Moriya
2004/0002902 A1 1/2004 Muehlhaeuser
2005/0057528 A1 3/2005 Kleen
2005/0060070 A1 * 3/2005 Kapolka et al. ................. 701/29
2005/0179617 A1 8/2005 Matsui et al.
2005/0212760 A1 9/2005 Marvit et al.
2005/0245302 A1 11/2005 Bathiche et al.
2006/0022952 A1 2/2006 Ryynanen
2006/0026536 A1 2/2006 Hotelling et al.
2006/0061545 A1 3/2006 Hughes et al.
2006/0097991 A1 5/2006 Hotelling et al.
2006/0119586 A1 6/2006 Grant et al.
2006/0129719 A1 * 6/2006 Cruz-Hernandez et al. .... 710/58
2006/0181510 A1 8/2006 Faith
2006/0192760 A1 8/2006 Moore et al.
2006/0197752 A1 9/2006 Hurst et al.
2006/0255683 A1 11/2006 Suzuki et al.
2006/0256074 A1 11/2006 Krum et al.
2006/0279476 A1 12/2006 Obata
2006/0279542 A1 12/2006 Flack et al.
2006/0284849 A1 12/2006 Grant et al.
2007/0066283 A1 3/2007 Haar et al.
2007/0139366 A1 6/2007 Dunko et al.
2007/0150826 A1 6/2007 Anzures et al.
2007/0152984 A1 7/2007 Ording et al.
2007/0236450 A1 10/2007 Colgate et al.
2007/0242040 A1 * 10/2007 Ullrich et al. ................. 345/157
2007/0247429 A1 10/2007 Westerman
2007/0247442 A1 10/2007 Andre et al.
2007/0265096 A1 11/2007 Kouno et al.
2007/0279392 A1 12/2007 Rosenberg et al.
2008/0024459 A1 1/2008 Poupyrev et al.
2008/0055277 A1 3/2008 Takenaka et al.
2008/0060856 A1 3/2008 Shahoian et al.
2008/0068334 A1 3/2008 Olien et al.
2008/0088580 A1 4/2008 Poupyrev et al.
2008/0111788 A1 5/2008 Rosenberg et al.
2008/0180406 A1 7/2008 Han et al.
2008/0216001 A1 9/2008 Ording et al.
2008/0287147 A1 11/2008 Grant et al.
2008/0300055 A1 12/2008 Lutnick et al.
2008/0303782 A1 12/2008 Grant et al.
2009/0002328 A1 1/2009 Ullrich et al.
2009/0015045 A1 * 1/2009 Nathan et al. .............. 297/217.3
2009/0079550 A1 3/2009 Makinen et al.
2009/0085878 A1 4/2009 Heubel et al.
2009/0109007 A1 4/2009 Makinen et al.
2009/0128503 A1 5/2009 Grant et al.
2009/0137269 A1 5/2009 Chung
2009/0166098 A1 7/2009 Sunder
2009/0167508 A1 7/2009 Fadell et al.
2009/0167509 A1 7/2009 Fadell et al.
2009/0167704 A1 7/2009 Terlizzi et al.
2009/0231276 A1 * 9/2009 Ullrich et al. ................. 345/157
2009/0250267 A1 10/2009 Heubel et al.
2009/0256817 A1 10/2009 Perlin et al.
2009/0270046 A1 10/2009 Lai
2009/0284485 A1 11/2009 Colgate et al.
2009/0315830 A1 12/2009 Westerman
2010/0013653 A1 1/2010 Birnbaum et al.
2010/0013761 A1 1/2010 Birnbaum et al.
2010/0017489 A1 1/2010 Birnbaum et al.
2010/0017759 A1 1/2010 Birnbaum et al.
2010/0045619 A1 2/2010 Birnbaum et al.
2010/0073304 A1 * 3/2010 Grant et al. .................. 345/173
2010/0085169 A1 4/2010 Poupyrev et al.
2010/0108408 A1 5/2010 Colgate et al.
2010/0127819 A1 5/2010 Radivojevic et al.
2010/0149134 A1 6/2010 Westerman et al.
2010/0156818 A1 6/2010 Burrough et al.
2010/0214243 A1 8/2010 Birnbaum et al.
2010/0231539 A1 9/2010 Cruz-Hernandez et al.
2010/0231550 A1 * 9/2010 Cruz-Hernandez et al. .. 345/174
2010/0245254 A1 9/2010 Olien et al.
2010/0265208 A1 10/2010 Kim et al.
2010/0313124 A1 12/2010 Privault et al.
2010/0328053 A1 12/2010 Yeh et al.
2011/0021272 A1 1/2011 Grant et al.
2011/0025609 A1 2/2011 Modarres et al.
2011/0043454 A1 2/2011 Modarres et al.
2011/0043527 A1 2/2011 Ording et al.
2011/0102340 A1 5/2011 Martin et al.
2011/0105103 A1 5/2011 Ullrich
2011/0109588 A1 5/2011 Makinen et al.
2011/0138277 A1 6/2011 Grant et al.
2011/0260988 A1 10/2011 Colgate et al.
2011/0264491 A1 10/2011 Birnbaum et al.
2012/0068957 A1 3/2012 Puskarich et al.
2012/0081276 A1 4/2012 Ullrich et al.
2012/0105333 A1 5/2012 Maschmeyer et al.
2012/0223880 A1 * 9/2012 Birnbaum et al. ............ 345/156

FOREIGN PATENT DOCUMENTS

WO WO 99/38064 7/1999
WO WO 2004/044728 A2 5/2004
WO WO 2004/075169 A2 9/2004
WO WO 2004/081776 A1 9/2004
WO WO 2005/103863 A 11/2005
WO WO 2008/132540 A1 11/2008
WO WO 2009/037379 3/2009
WO WO 2009/071750 A1 6/2009
WO WO 2009/074185 A1 6/2009
WO WO 2009/141502 11/2009
WO WO 2010/088477 A1 8/2010

OTHER PUBLICATIONS

Biet, M. et al., "New Tactile Devices Using Piezoelectric Actuators", L2EP, University of Lille, Polytech-Lille, Actuator 2006, 10th International Conference on New Actuators, Jun. 14-16, 2006, Bremen, Germany, pp. 989-992.

(56) References Cited

OTHER PUBLICATIONS

Bonderud, Doug, "Nokia Files Patent to Make Phones Digitally Stimulating", InventorSpot.com [online], [retrieved Apr. 21, 2011]. Retrieved from the Internet <URL: http://inventorspot.com/articles/nokia_files_patent_make_phones_digitally_stimulating>.
Buxton, Bill, "Multi-Touch Systems that I have Known and Loved"; Microsoft Research; Original: Jan. 12, 2007; Version: Jul. 17, 2007; <URL: http://www.billbuxton.com/multitouchOverviewhtml> pp. -16.
Chang et al., ComTouch: Design of a Vibrotactile Communication Device, DIS2002, London Copyright 2002 ACM 1-58113-2-9-0/00/0008, 10 pages.
Dewitt, A., Designing Sonification of User data in Affective Interaction, Master of Science Thesis Stockholm, Sweden, XP 002551466, at URL:http://w3.nada.kt.se/utbildning/grukth/exjobb/rapportlistor/2007/rapporter07/de_witt_anna_07142.pdf, as available via the Internet and printed on Oct. 20, 2009.
Greene, Kate, "A Touch Screen with Texture", Technology Review [online], [retrieved Apr. 21, 2011]. Retrieved from the Internet <URL: http://www.technologyreview.com/printer_friendly_article.aspx?id=26506>.
Hsin-Un Yao et al.; "An Experiment on Length Perception with a Virtual Rolling Stone"; Proc. Eurohaptics 2006; pp. 325-330.
http://en.wikipedia.org/w/index.php?title=Gesture_recognition&printable=yes; Jul. 23, 2010.
Iwamoto, T. et al., "Airborne Ultrasound Tactile Display", The University of Tokyo, SIGGRAPH 2008, Los Angeles, California, Aug. 11-15, 2008, ISBN 978-1-60558-466-9/08/0008.
Iwamoto, T. et al., "Non-contact Method for Producing Tactile Sensation Using Airborned Ultrasound", Department of Information Physics and Computing Graduate School of Information Science and Technology The University of Tokyo, EuroHaptics 2008, LNCS 5024, pp. 504-513, Springer-Verlag Berlin Heidelberg 2008.
Kaaresoja, T. et al., Snap-Crackle-Pop: Tactile Feedback for Mobile Touch Screens, Proceedings of the Eurohaptics 2006, XP 002551465, at http://lsc.univ-evry.fr/{eurohaptics/upload/cd/papers/f80, as available via the Internet and printed Oct. 20, 2009.
Marks, Paul, "Nokia touchscreen creates texture illusion", New Scientist [online], [retrieved Apr. 21, 2011]. Retrieved from the Internet <URL: http://www.newscientist.com/article/dn19510-nokia-touchscreen-cretes-texture-illusion.html>.
Oakley, I. et al., Contact IM: Exploring Asynchronous Touch over Distance, Palpable Machines Research Group, Media Lab Europe, XP 007910188, at http://people.cs.vt.edu/[wangr06/touch%20review%20origization/Oak002 as available via the internet and printed Oct. 20, 2009.
Rovers, A. et al., HIM: A Framework for Haptic Instant Messaging, CHI 2004 (CHI Conference Proceedings. Human Factors in Computing Systems), XP 002464573, Vienna Austria, Apr. 2004, p. 1313-1316.
Sekiguchi, Y. et al., Haptic Interface using Estimation of Box Contents Metaphor, Proceedings of ICAT 2003, Tokyo, Japan, XP 002551467, at http://www.vrsj.org/ic-at/papers/2003/00947-00000, as available via the Internet and printed Oct. 20, 2009.
Smith, Ned, "Feel the future: Touch screens that touch back", MSNBC [online], [retrieved Apr. 21, 2011]. Retrieved from the Internet <URL: http://www.msnbc.msn.com/id/40845743/ns/technology_and_science-tech_and_gadgets/t/feel-future-touch-screens-touch-back/#.T5cIU7ONfEY>.
Williamson, J. et al., Shoogle: Excitatory Multimodal Interaction on Mobile Devices, CHI 2007 Proceedings-Shake, Rattle and Roll: New Forms of Input and Output, 2007, pp. 121-124, XP 002549378.

* cited by examiner

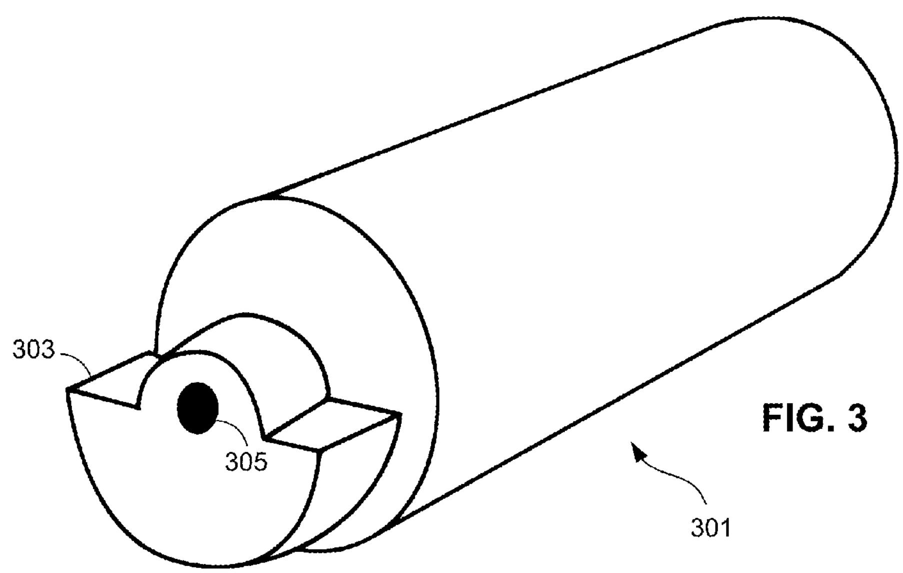
FIG. 3
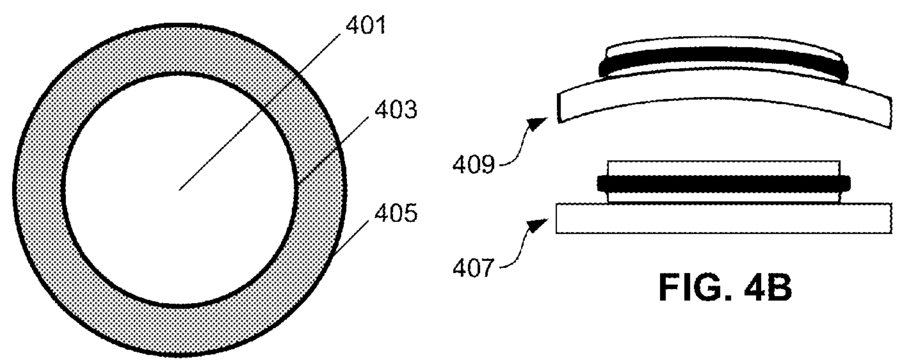
FIG. 4B
FIG. 4A
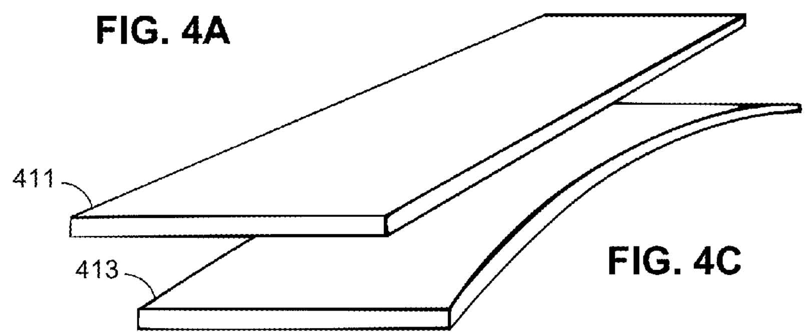
FIG. 4C

SYSTEM AND METHOD FOR DISPLAY OF MULTIPLE DATA CHANNELS ON A SINGLE HAPTIC DISPLAY

FIELD OF THE INVENTION

One embodiment is directed generally to a user interface for a device, and in particular to the display of multiple data channels of haptic feedback for the user interface.

BACKGROUND INFORMATION

Electronic device manufacturers strive to produce a rich interface for users. Conventional devices use visual and auditory cues to provide feedback to a user. In some interface devices, kinesthetic feedback (such as active and resistive force feedback) and/or tactile feedback (such as vibration, texture, and heat) is also provided to the user, more generally known collectively as "haptic feedback" or "haptic effects". Haptic feedback can provide cues that enhance and simplify the user interface. Specifically, vibration effects, or vibrotactile haptic effects, may be useful in providing cues to users of electronic devices to alert the user to specific events, or provide realistic feedback to create greater sensory immersion within a simulated or virtual environment.

In order to generate vibration effects, many devices utilize some type of actuator or haptic output device. Known haptic output devices used for this purpose include an electromagnetic actuator such as an Eccentric Rotating Mass ("ERM") in which an eccentric mass is moved by a motor, a Linear Resonant Actuator ("LRA") in which a mass attached to a spring is driven back and forth, or a "smart material" such as piezoelectric, electro-active polymers or shape memory alloys. Haptic output devices also broadly include non-mechanical or non-vibratory devices such as those that use electrostatic friction (ESF), ultrasonic surface friction (USF), or those that induce acoustic radiation pressure with an ultrasonic haptic transducer, or those that use a haptic substrate and a flexible or deformable surface, or those that provide projected haptic output such as a puff of air using an air jet, and so on.

Traditional architectures are designed to provide haptic feedback only for a single haptic event. However, if multiple haptic events are combined it may overwhelm or distract the user from a primary task. Therefore, there is a need for an improved system of providing a haptic effect where low-importance or high-density information is perceivable, but not overwhelming or distracting from a primary task.

SUMMARY OF THE INVENTION

One embodiment is a system that produces a haptic effect and generates a drive signal that includes at least two haptic effect signals each having a priority level. The haptic effect is a combination of the haptic effect signals and priority levels. The haptic effect may optionally be a combination of the two haptic effect signals if the priority levels are the same, otherwise only the haptic effect signal with the highest priority is used. The frequency of haptic notifications may also be used to generate a drive signal using foreground and background haptic effect channels depending on whether the frequency ratio exceeds a foreground haptic effect threshold.

BRIEF DESCRIPTION OF THE DRAWINGS

FIG. 3 is a cut-away perspective view of an ERM implementation of a haptic actuator according to one embodiment of the present invention.

FIGS. 4A-4C are views of a piezoelectric implementation of a haptic actuator according to one embodiment of the present invention.

DETAILED DESCRIPTION

Figure 1:
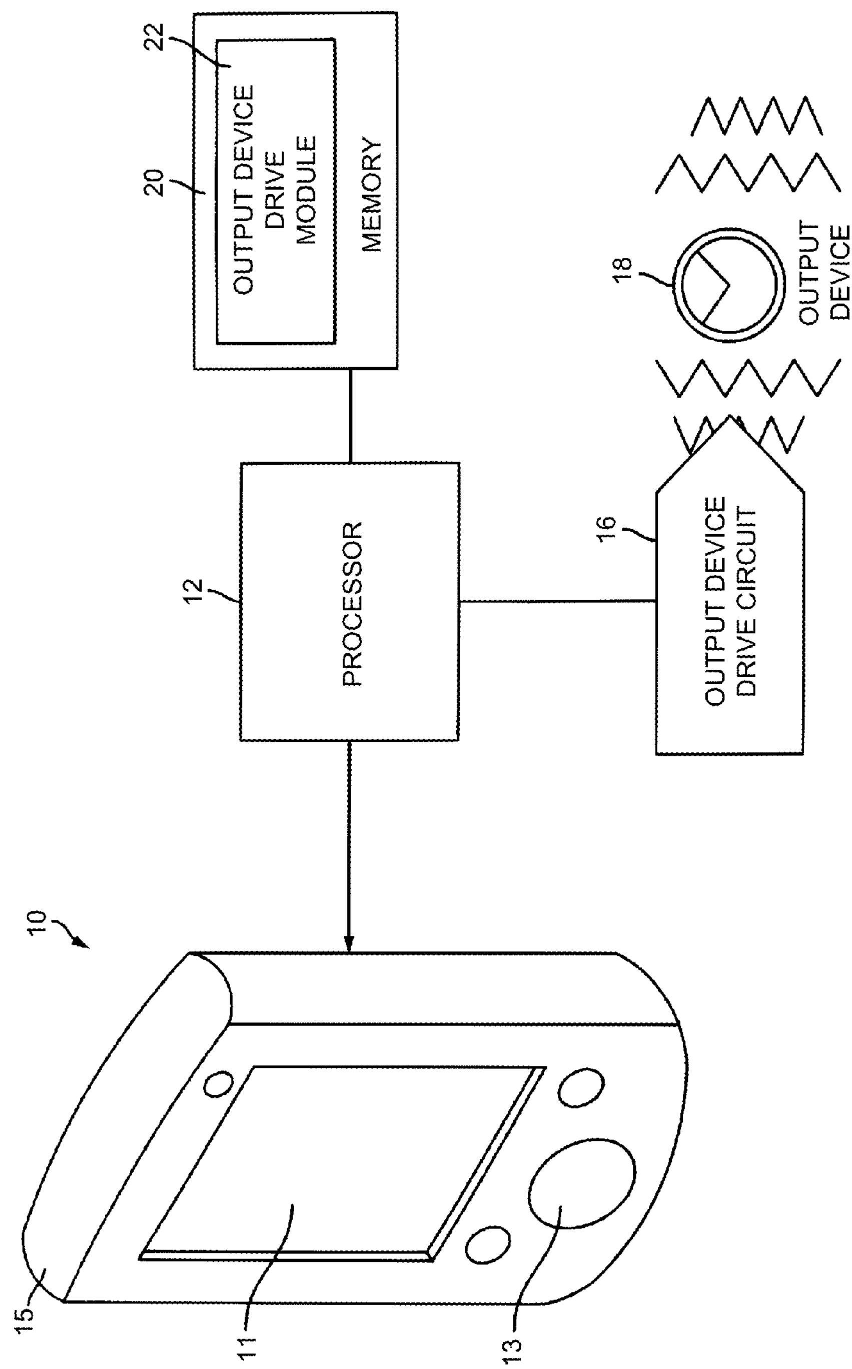
FIG. 1 is a block diagram of a haptically-enabled system according to one embodiment of the present invention.

As described below, a dynamic haptic effect refers to a haptic effect that evolves over time as it responds to one or more input parameters. Dynamic haptic effects are haptic or vibrotactile effects displayed on haptic devices to represent a change in state of a given input signal. The input signal can be a signal captured by sensors on the device with haptic feedback, such as position, acceleration, pressure, orientation, or proximity, or signals captured by other devices and sent to the haptic device to influence the generation of the haptic effect.

A dynamic effect signal can be any type of signal, but does not necessarily have to be complex. For example, a dynamic effect signal may be a simple sine wave that has some property such as phase, frequency, or amplitude that is changing over time or reacting in real time according to a mapping schema which maps an input parameter onto a changing property of the effect signal. An input parameter may be any type of input capable of being provided by a device, and typically may be any type of signal such as a device sensor signal. A device sensor signal may be generated by any means, and typically may be generated by capturing a user gesture with a device. Dynamic effects may be very useful for gesture interfaces, but the use of gestures or sensors are not necessarily required to create a dynamic signal.

One common scenario that does not involve gestures directly is defining the dynamic haptic behavior of an animated widget. For example, when a user scrolls a list, it is not typically the haptification of the gesture that will feel most intuitive, but instead the motion of the widget in response to the gesture. In the scroll list example, gently sliding the list may generate a dynamic haptic feedback that changes according to the speed of the scrolling, but flinging the scroll bar may produce dynamic haptics even after the gesture has ended. This creates the illusion that the widget has some physical properties and it provides the user with information about the state of the widget such as its velocity or whether it is in motion.

A gesture is any movement of the body that conveys meaning or user intent. It will be recognized that simple gestures may be combined to form more complex gestures. For example, bringing a finger into contact with a touch sensitive surface may be referred to as a “finger on” gesture, while removing a finger from a touch sensitive surface may be referred to as a separate “finger off” gesture. If the time between the “finger on” and “finger off” gestures is relatively short, the combined gesture may be referred to as “tapping”; if the time between the “finger on” and “finger off” gestures is relatively long, the combined gesture may be referred to as “long tapping”; if the distance between the two dimensional (x,y) positions of the “finger on” and “finger off” gestures is relatively large, the combined gesture may be referred to as “swiping”; if the distance between the two dimensional (x,y) positions of the “finger on” and “finger off” gestures is relatively small, the combined gesture may be referred to as “smearing”, “smudging” or “flicking”. Any number of two dimensional or three dimensional simple or complex gestures may be combined in any manner to form any number of other gestures, including, but not limited to, multiple finger contacts, palm or first contact, or proximity to the device. A gesture can also be any form of hand movement recognized by a device having an accelerometer, gyroscope, or other motion sensor, and converted to electronic signals. Such electronic signals can activate a dynamic effect, such as shaking virtual dice, where the sensor captures the user intent that generates a dynamic effect.

FIG. 1 is a block diagram of a haptically-enabled system 10 according to one embodiment of the present invention. System 10 includes a touch sensitive surface 11 or other type of user interface mounted within a housing 15, and may include mechanical keys/buttons 13. Internal to system 10 is a haptic feedback system that generates vibrations on system 10. In one embodiment, the vibrations are generated on touch surface 11.

The haptic feedback system includes a processor 12. Coupled to processor 12 is a memory 20 and an actuator drive circuit 16, which is coupled to a haptic actuator 18. Processor 12 may be any type of general purpose processor, or could be a processor specifically designed to provide haptic effects, such as an application-specific integrated circuit (“ASIC”). Processor 12 may be the same processor that operates the entire system 10, or may be a separate processor. Processor 12 can decide what haptic effects are to be played and the order in which the effects are played based on high level parameters. In general, the high level parameters that define a particular haptic effect include magnitude, frequency and duration. Low level parameters such as streaming motor commands could also be used to determine a particular haptic effect. A haptic effect may be considered dynamic if it includes some variation of these parameters when the haptic effect is generated or a variation of these parameters based on a user’s interaction.

Processor 12 outputs the control signals to drive circuit 16 which includes electronic components and circuitry used to supply actuator 18 with the required electrical current and voltage to cause the desired haptic effects. System 10 may include more than one actuator 18, and each actuator may include a separate drive circuit 16, all coupled to a common processor 12. Memory device 20 can be any type of storage device or computer-readable medium, such as random access memory (RAM) or read-only memory (ROM). Memory 20 stores instructions executed by processor 12. Among the instructions, memory 20 includes an actuator drive module 22 which are instructions that, when executed by processor 12, generate drive signals for actuator 18 while also determining feedback from actuator 18 and adjusting the drive signals accordingly. The functionality of module 22 is discussed in more detail below. Memory 20 may also be located internal to processor 12, or any combination of internal and external memory.

Touch surface 11 recognizes touches, and may also recognize the position and magnitude or pressure of touches on the surface, such as the number of touches, the size of the contact points, pressure, etc. The data corresponding to the touches is sent to processor 12, or another processor within system 10, and processor 12 interprets the touches and in response generates haptic effect signals. Touch surface 11 may sense touches using any sensing technology, including capacitive sensing, resistive sensing, surface acoustic wave sensing, pressure sensing, optical sensing, etc. Touch surface 11 may sense multi-touch contacts and may be capable of distinguishing multiple touches that occur at the same time. Touch surface 11 may be a touchscreen that generates and displays images for the user to interact with, such as keys, dials, etc., or may be a touchpad with minimal or no images.

System 10 may be a handheld device, such as a cellular telephone, PDA, computer tablet, gaming console, etc. or may be any other type of device that provides a user interface and includes a haptic effect system that includes one or more ERMs, LRAs, electrostatic or other types of actuators. The user interface may be a touch sensitive surface, or can be any other type of user interface such as a mouse, touchpad, mini-joystick, scroll wheel, trackball, game pads or game controllers, etc. In embodiments with more than one actuator, each actuator may have a different output capability in order to create a wide range of haptic effects on the device. Each actuator may be any type of haptic actuator or a single or multidimensional array of actuators.

Figure 2:
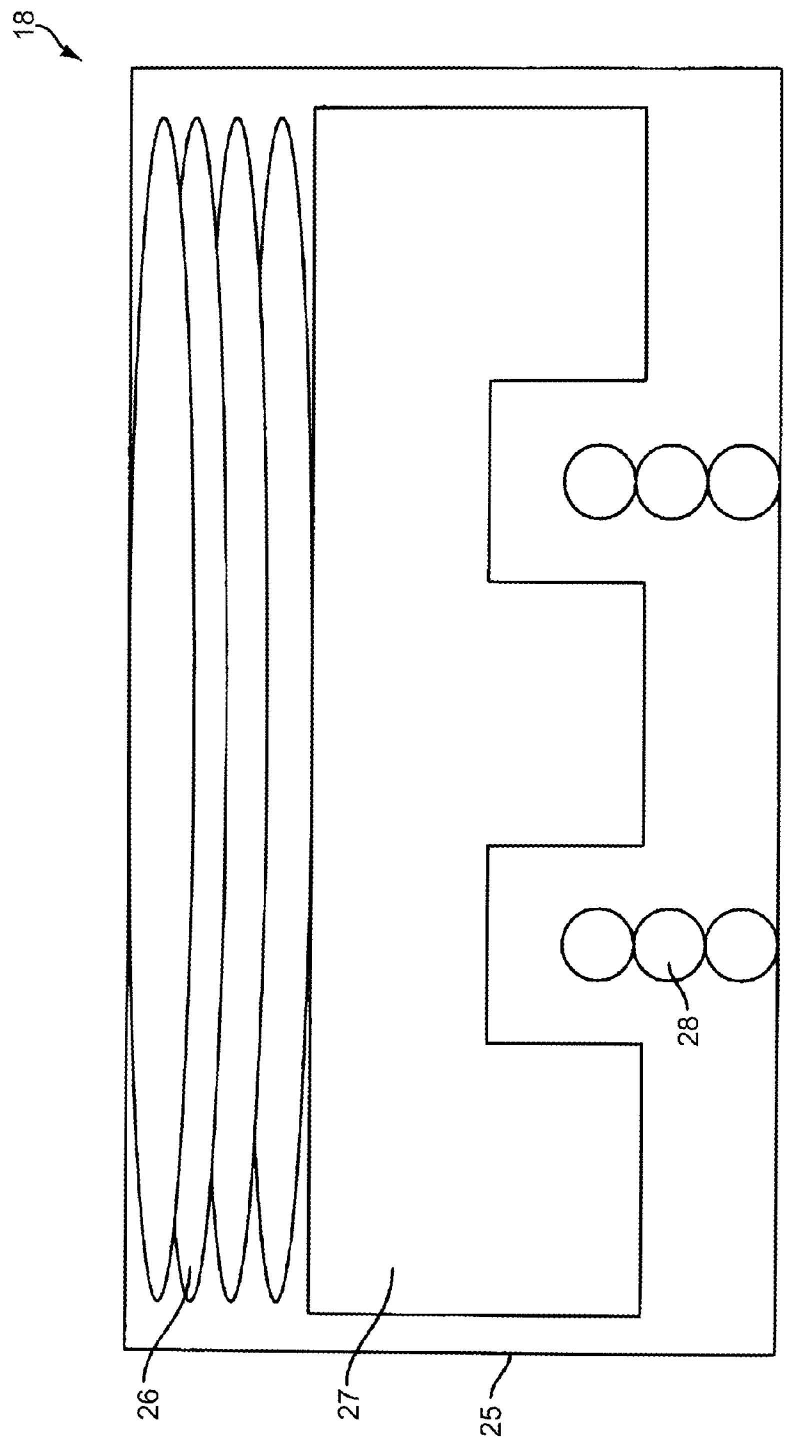
FIG. 2 is a cut-away perspective view of an LRA implementation of a haptic actuator according to one embodiment of the present invention.

FIG. 2 is a cut-away side view of an LRA implementation of actuator 18 in accordance to one embodiment. LRA 18 includes a casing 25, a magnet/mass 27, a linear spring 26, and an electric coil 28. Magnet 27 is mounted to casing 25 by spring 26. Coil 28 is mounted directly on the bottom of casing 25 underneath magnet 27. LRA 18 is typical of any known LRA. In operation, when current flows through coil 28 a magnetic field forms around coil 28 which in interaction with the magnetic field of magnet 27 pushes or pulls on magnet 27. One current flow direction/polarity causes a push action and the other a pull action. Spring 26 controls the up and down movement of magnet 27 and has a deflected up position where it is compressed, a deflected down position where it is expanded, and a neutral or zero-crossing position where it is neither compressed or deflected and which is equal to its resting state when no current is being applied to coil 28 and there is no movement/oscillation of magnet 27.

For LRA 18, a mechanical quality factor or “Q factor” can be measured. In general, the mechanical Q factor is a dimensionless parameter that compares a time constant for decay of an oscillating physical system’s amplitude to its oscillation period. The mechanical Q factor is significantly affected by mounting variations. The mechanical Q factor represents the ratio of the energy circulated between the mass and spring over the energy lost at every oscillation cycle. A low Q factor means that a large portion of the energy stored in the mass and spring is lost at every cycle. In general, a minimum Q factor occurs with system 10 is held firmly in a hand due to energy being absorbed by the tissues of the hand. The maximum Q factor generally occurs when system 10 is pressed against a hard and heavy surface that reflects all of the vibration energy back into LRA 18.

In direct proportionality to the mechanical Q factor, the forces that occur between magnet/mass 27 and spring 26 at resonance are typically 10-100 times larger than the force that coil 28 must produce to maintain the oscillation. Consequently, the resonant frequency of LRA 18 is mostly defined by the mass of magnet 27 and the compliance of spring 26. However, when an LRA is mounted to a floating device (i.e., system 10 held softly in a hand), the LRA resonant frequency shifts up significantly. Further, significant frequency shifts can occur due to external factors affecting the apparent mounting weight of LRA 18 in system 10, such as a cell phone flipped open/closed or the phone held tightly.

FIG. 3 is a cut-away perspective view of an ERM implementation of actuator 18 according to one embodiment of the present invention. ERM 18 includes a rotating mass 301 having an off-center weight 303 that rotates about an axis of rotation 305. In operation, any type of motor may be coupled to ERM 18 to cause rotation in one or both directions around the axis of rotation 305 in response to the amount and polarity of voltage applied to the motor. It will be recognized that an application of voltage in the same direction of rotation will have an acceleration effect and cause the ERM 18 to increase its rotational speed, and that an application of voltage in the opposite direction of rotation will have a braking effect and cause the ERM 18 to decrease or even reverse its rotational speed.

One embodiment of the present invention provides haptic feedback by determining and modifying the angular speed of ERM 18. Angular speed is a scalar measure of rotation rate, and represents the magnitude of the vector quantity angular velocity. Angular speed or frequency ω, in radians per second, correlates to frequency v in cycles per second, also called Hz, by a factor of 2π. The drive signal includes a drive period where at least one drive pulse is applied to ERM 18, and a monitoring period where the back electromagnetic field ("EMF") of the rotating mass 301 is received and used to determine the angular speed of ERM 18. In another embodiment, the drive period and the monitoring period are concurrent and the present invention dynamically determines the angular speed of ERM 18 during both the drive and monitoring periods.

FIGS. 4A-4C are views of a piezoelectric implementation of a haptic actuator 18 according to one embodiment of the present invention. FIG. 4A shows a disk piezoelectric actuator that includes an electrode 401, a piezo ceramics disk 403 and a metal disk 405. As shown in FIG. 4B, when a voltage is applied to electrode 401, the piezoelectric actuator bends in response, going from a relaxed state 407 to a transformed state 409. When a voltage is applied, it is that bending of the actuator that creates the foundation of vibration. Alternatively, FIG. 4C shows a beam piezoelectric actuator that operates similarly to a disk piezoelectric actuator by going from a relaxed state 411 to a transformed state 413.

Figure 5:
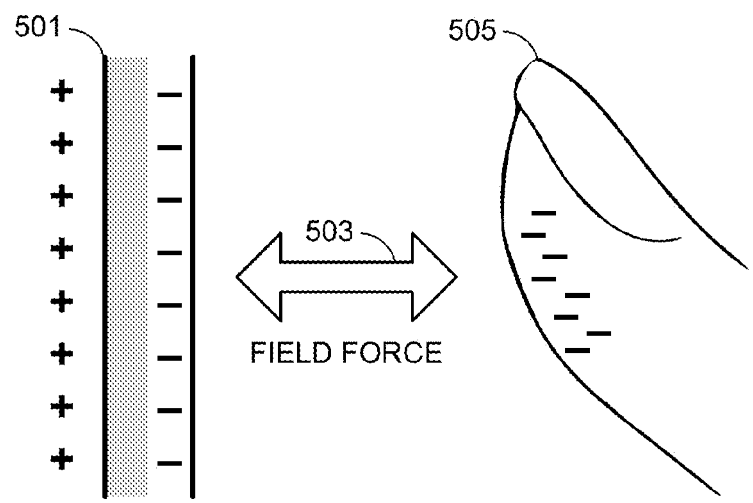
FIG. 5 is a view of a haptic device using electrostatic friction (ESF) according to one embodiment of the present invention.

FIG. 5 is a view of a haptic device using electrostatic friction (ESF) according to one embodiment of the present invention. Similar to the operational principles described by Makinen et al. in U.S. Pat. No. 7,982,588, the embodiment is based on the discovery that subcutaneous Pacinian corpuscles can be stimulated by means of a capacitive electrical coupling and an appropriately dimensioned control voltage, either without any mechanical stimulation of the Pacinian corpuscles or as an additional stimulation separate from such mechanical stimulation. An appropriately dimensioned high voltage is used as the control voltage. In the present context, a high voltage means such a voltage that direct galvanic contact must be prevented for reasons of safety and/or user comfort. This results in a capacitive coupling between the Pacinian corpuscles and the apparatus causing the stimulation, wherein one side of the capacitive coupling is formed by at least one galvanically isolated electrode connected to the stimulating apparatus, while the other side, in close proximity to the electrode, is formed by the body member, preferably a finger, of the stimulation target, such as the user of the apparatus, and more specifically the subcutaneous Pacinian corpuscles.

It likely that the invention is based on a controlled formation of an electric field between an active surface of the apparatus and the body member, such as a finger, approaching or touching it. The electric field tends to give rise to an opposite charge on the proximate finger. A local electric field and a capacitive coupling can be formed between the charges. The electric field directs a force on the charge of the finger tissue. By appropriately altering the electric field a force capable of moving the tissue may arise, whereby the sensory receptors sense such movement as vibration.

As shown in FIG. 5, one or more conducting electrodes 501 are provided with an insulator. When a body member such as finger 505 is proximate to the conducting electrode 501, the insulator prevents flow of direct current from the conducting electrode to the body member 505. A capacitive coupling field force 503 over the insulator is formed between the conducting electrode 501 and the body member 505. The apparatus also comprises a high-voltage source for applying an electrical input to the one or more conducting electrodes, wherein the electrical input comprises a low-frequency component in a frequency range between 10 Hz and 1000 Hz. The capacitive coupling and electrical input are dimensioned to produce an electrosensory sensation which is produced independently of any mechanical vibration of the one or more conducting electrodes or insulators.

Figure 6:
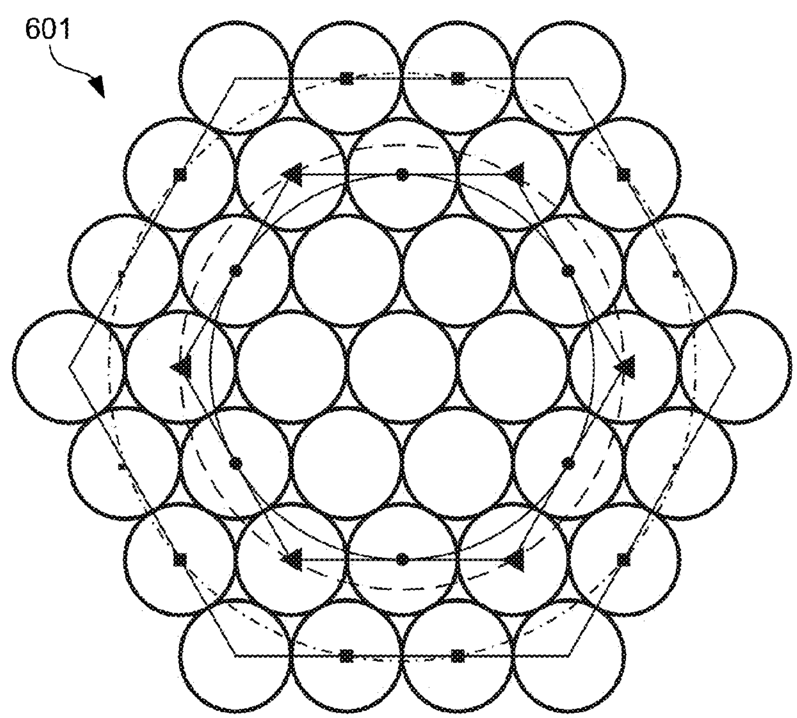
FIG. 6 is a view of a haptic device for inducing acoustic radiation pressure with an ultrasonic haptic transducer according to one embodiment of the present invention.

FIG. 6 is a view of a haptic device for inducing acoustic radiation pressure with an ultrasonic haptic transducer similar to that described by Iwamoto et al., "Non-contact Method for Producing Tactile Sensation Using Airborne Ultrasound", Eurohaptics 2008, LNCS 5024, pp. 504-513. An airborne ultrasound transducer array 601 is designed to provide tactile feedback in three-dimensional (3D) free space. The array radiates airborne ultrasound, and produces high-fidelity pressure fields onto the user's hands without the use of gloves or mechanical attachments. The method is based on a nonlinear phenomenon of ultrasound; acoustic radiation pressure. When an object interrupts the propagation of ultrasound, a pressure field is exerted on the surface of the object. This pressure is called acoustic radiation pressure. The acoustic radiation pressure P [Pa] is simply described as $P=\alpha E$, where E [$J=m^3$] is the energy density of the ultrasound and a is a constant ranging from 1 to 2 depending on the reflection properties of the surface of the object. The equation describes how the acoustic radiation pressure is proportional to the energy density of the ultrasound. The spatial distribution of the energy density of the ultrasound can be controlled by using the wave field synthesis techniques. With an ultrasound transducer array, various patterns of pressure field are produced in 3D free space. Unlike air-jets, the spatial and temporal resolutions are quite fine. The spatial resolution is comparable to the wavelength of the ultrasound. The frequency characteristics are sufficiently fine up to 1 kHz.

The airborne ultrasound can be applied directly onto the skin without the risk of the penetration. When the airborne ultrasound is applied on the surface of the skin, due to the large difference between the characteristic acoustic impedance of the air and that of the skin, about 99.9% of the incident acoustic energy is reflected on the surface of the skin. Hence, this tactile feedback system does not require the users to wear any clumsy gloves or mechanical attachments.

Figure 7:
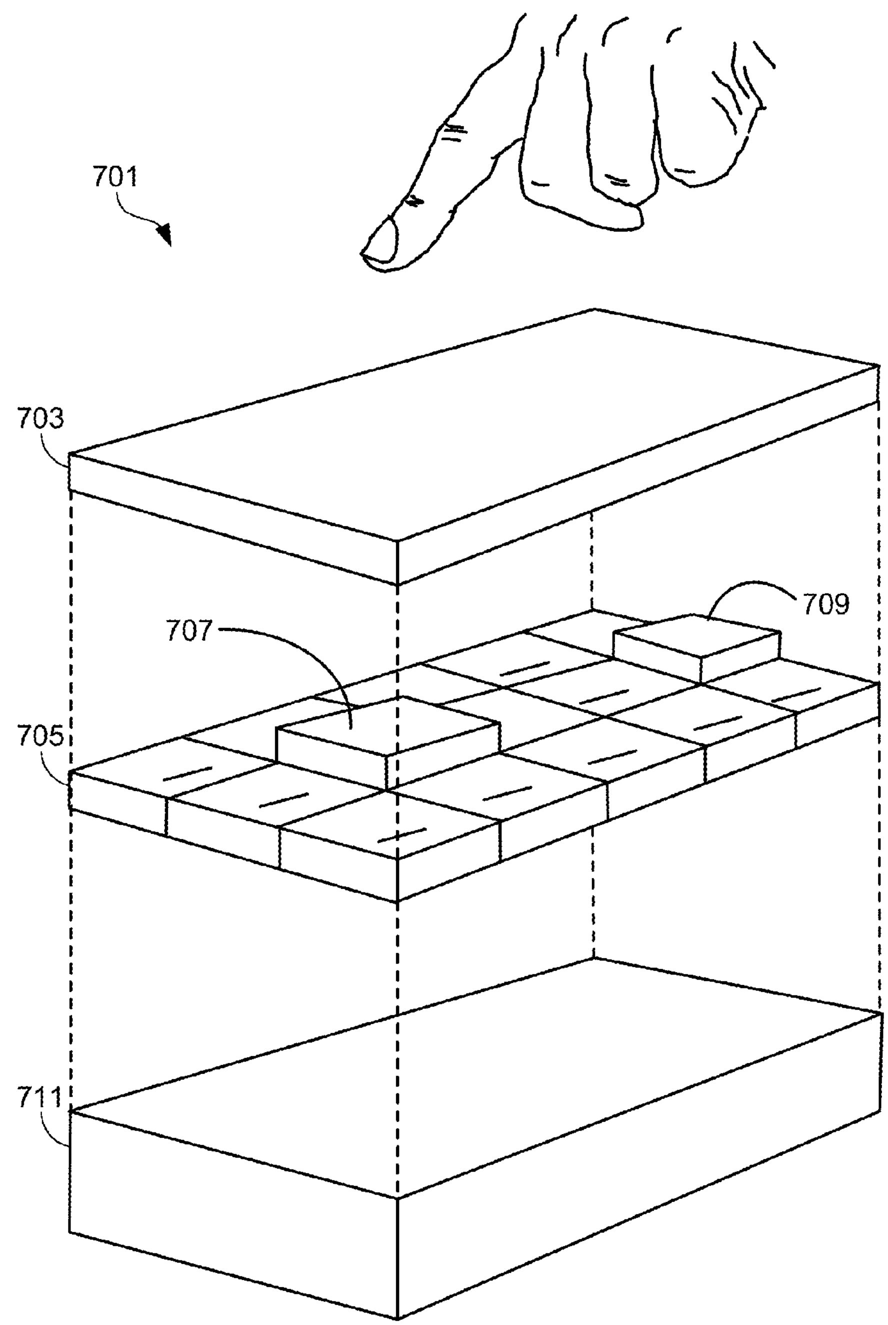
FIG. 7 is a view of a haptic device using a haptic substrate and flexible or deformable surface according to one embodiment of the present invention.

FIG. 7 shows a three-dimensional (3D) diagram illustrating a haptic device 701 using a haptic substrate and a flexible surface in accordance with one embodiment of the present invention. Device 701 includes a flexible surface layer 703, a haptic substrate 705, and a deforming mechanism 711. It should be noted that device 701 can be a user interface device, such as an interface for a cellular phone, a personal digital assistant ("PDA"), an automotive data input system, and so forth. It should be further noted that the underlying concept of the exemplary embodiment of the present invention would not change if one or more blocks (circuits or layers) were added to or removed from device 701.

Flexible surface layer 703, in one instance, is made of soft and/or elastic materials such as silicone rubber, which is also known as polysiloxane. A function of the flexible surface layer 703 is to change its surface shape or texture upon contact with the physical pattern of haptic substrate 705. The physical pattern of haptic substrate 705 is variable as one or more of the local features 110-124 can be raised or lowered to present features to affect the surface of the flexible surface layer 703 upon contact. Once the physical pattern of haptic substrate 705 is determined, the texture of flexible surface layer 703 can change to confirm its surface texture to the physical pattern of haptic substrate 705. It should be note that the deformation of flexible surface layer 703 from one texture to another can be controlled by deforming mechanism 711. For example, when deforming mechanism 711 is not activated, flexible surface layer 703 maintains its smooth configuration floating or sitting over haptic substrate 705. The surface configuration of flexible surface layer 703, however, deforms or changes from a smooth configuration to a coarse configuration when deforming mechanism 711 is activated and the haptic substrate 705 is in contact with the flexible surface layer 703 so as to generate a similar pattern on the top surface of the flexible surface layer 703.

Alternatively, flexible surface layer 703 is a flexible touch sensitive surface, which is capable of accepting user inputs. The flexible touch sensitive surface can be divided into multiple regions wherein each region of the flexible touch sensitive surface can accept an input when the region is being touched or depressed by a finger. In one embodiment, the flexible touch sensitive surface includes a sensor, which is capable of detecting a nearby finger and waking up or turning on the device. Flexible surface layer 703 may also include a flexible display, which is capable of deforming together with flexible surface layer 703. It should be noted that various flexible display technologies can be used to manufacture flexible displays, such as organic light-emitting diode (OLED), organic, or polymer TFT (Thin Film Transistor).

Haptic substrate 705 is a surface reconfigurable haptic device capable of changing its surface pattern in response to one or more pattern activating signals. Haptic substrate 705 can also be referred to as a haptic mechanism, a haptic layer, a tactile element, and the like. Haptic substrate 705, in one embodiment, includes multiple tactile or haptic regions 707, 709, wherein each region can be independently controlled and activated. Since each tactile region can be independently activated, a unique surface pattern of haptic substrate 705 can be composed in response to the pattern activating signals. In another embodiment, every tactile region is further divided into multiple haptic bits wherein each bit can be independently excited or activated or deactivated.

Haptic substrate 705, or a haptic mechanism, in one embodiment, is operable to provide haptic feedback in response to an activating command or signal. Haptic substrate 705 provides multiple tactile or haptic feedbacks wherein one tactile feedback is used for surface deformation, while another tactile feedback is used for input confirmation. Input confirmation is a haptic feedback to inform a user about a selected input. Haptic mechanism 705, for example, can be implemented by various techniques including vibration, vertical displacement, lateral displacement, push/pull technique, air/fluid pockets, local deformation of materials, resonant mechanical elements, piezoelectric materials, micro-electro-mechanical systems ("MEMS") elements, thermal fluid pockets, MEMS pumps, variable porosity membranes, laminar flow modulation, or the like.

Haptic substrate 705, in one embodiment, is constructed by semi-flexible or semi-rigid materials. In one embodiment, haptic substrate should be more rigid than flexible surface 703 thereby the surface texture of flexible surface 703 can confirm to the surface pattern of haptic substrate 705. Haptic substrate 705, for example, includes one or more actuators, which can be constructed from fibers (or nanotubes) of electroactive polymers ("EAP"), piezoelectric elements, fiber of shape memory alloys ("SMAs") or the like. EAP, also known as biological muscles or artificial muscles, is capable of changing its shape in response to an application of voltage. The physical shape of an EAP may be deformed when it sustains large force. EAP may be constructed from Electrostrictive Polymers, Dielectric elastomers, Conducting Polyers, Ionic Polymer Metal Composites, Responsive Gels, Bucky gel actuators, or a combination of the above-mentioned EAP materials.

SMA (Shape Memory Alloy), also known as memory metal, is another type of material which can be used to construct haptic substrate 705. SMA may be made of copper-zinc-aluminum, copper-aluminum-nickel, nickel-titanium alloys, or a combination of copper-zinc-aluminum, copper-aluminum-nickel, and/or nickel-titanium alloys. A characteristic of SMA is that when its original shape is deformed, it regains its original shape in accordance with the ambient temperature and/or surrounding environment. It should be noted that the present embodiment may combine the EAP, piezoelectric elements, and/or SMA to achieve a specific haptic sensation.

Deforming mechanism 711 provides a pulling and/or pushing force to translate elements in the haptic substrate 705 causing flexible surface 703 to deform. For example, when deforming mechanism 711 creates a vacuum between flexible surface 703 and haptic substrate 705, flexible surface 703 is pushed against haptic substrate 705 causing flexible surface 703 to show the texture of flexible surface 703 in accordance with the surface pattern of haptic substrate 705. In other words, once a surface pattern of haptic substrate 705 is generated, flexible surface is pulled or pushed against haptic substrate 705 to reveal the pattern of haptic substrate 705 through the deformed surface of flexible surface 703. In one embodiment, haptic substrate 705 and deforming mechanism 711 are constructed in the same or substantially the same layer.

Upon receipt of a first activating signal, haptic substrate 705 generates a first surface pattern. After formation of the surface pattern of haptic substrate 705, deforming mechanism 711 is subsequently activated to change surface texture of flexible surface 703 in response to the surface pattern of haptic substrate 705. Alternatively, if haptic substrate 705 receives a second activating signal, it generates a second pattern.

Haptic substrate 705 further includes multiple tactile regions wherein each region can be independently activated to form a surface pattern of the substrate. Haptic substrate 705 is also capable of generating a confirmation feedback to confirm an input selection entered by a user. Deforming mechanism 711 is configured to deform the surface texture of flexible surface 703 from a first surface characteristic to a second surface characteristic. It should be noted that haptic device further includes a sensor, which is capable of activating the device when the sensor detects a touch on flexible surface 703. Deforming mechanism 711 may be a vacuum generator, which is capable of causing flexible surface 703 to collapse against the first surface pattern to transform its surface configuration in accordance with the configuration of first pattern of haptic substrate 705.

Haptic substrate 705 illustrates the state when tactile regions 707 and 709 are activated. Tactile regions 707 and 709 are raised in a z-axis direction. Upon receipt of one or more activating signals, haptic substrate 705 identifies a surface pattern in accordance with the activating signals. Haptic substrate 705 provides identified pattern by activating various tactile regions such as regions 707 and 709 to generate the pattern. It should be noted that tactile regions 707 and 709 imitate two buttons or keys. In another embodiment, tactile region 707 or 709 includes multiple haptic bits wherein each bit can be controlled for activating or deactivating.

Figure 8A:
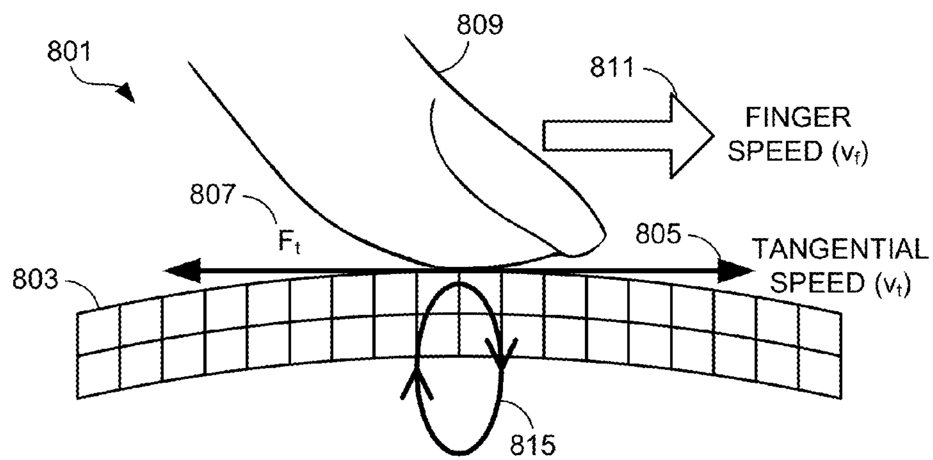
FIG. 8 is a view of a haptic device using ultrasonic surface friction (USF) according to one embodiment of the present invention.
Figure 8B:
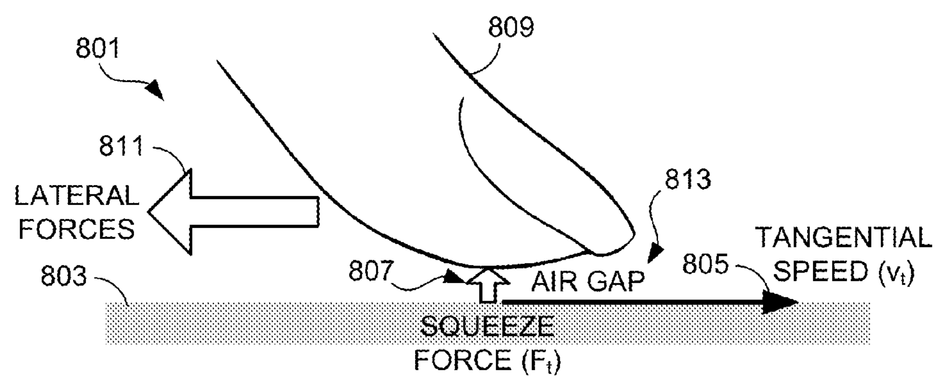

FIG. 8 is a view of a haptic device using ultrasonic surface friction (USF) similar to that described by Biet et al., "New Tactile Devices Using Piezoelectric Actuators", ACTUATOR 2006, 10$^{th}$ International Conference on New Actuators, 14-16 Jun. 2006, Bremen, Germany. An ultrasonic vibration display 801 produces ultrasonic vibrations in the order of a few micrometers. The display 801 consists of a touch interface surface 803 that vibrates at the ultrasound range. The vibrations 805 travel along the touch surface 803 at a speed $v_t$ when a finger 809 is in contact and applies a force 807 $F_t$ to the surface 803. The vibrations 805 create an apparent reduction of friction on the surface 803. One explanation is that by moving up and down, the touch surface 803 creates an air gap 813 between the surface 803 and the interacting finger 809, and is the air gap 813 that causes the reduction in friction. This can be thought as of a Lamb wave 815 along the surface 803 that at some instants in time is in contact with the finger 809 when the finger 809 is in contact with the crest or peak of the wave 805, and sometimes is not when the finger 809 is above the valley of the wave 805. When finger 809 is moved in a lateral direction 811 at a speed $v_f$, the apparent friction of the surface 803 is reduced due to the on and off contact of the surface 803 with the finger 809. When the surface 803 is not activated, the finger 809 is always in contact with the surface 803 and the static or kinetic coefficients of friction remain constant.

Because the vibrations 805 occur on surface 803 in the ultrasound range of typically 20 KHz or greater, the wavelength content is usually smaller than the finger size, thus allowing for a consistent experience. It will be noted that the normal displacement of surface 803 is in the order of less than 5 micrometers, and that a smaller displacement results in lower friction reduction.

Figures 9A, 9B, 9C, 9D:
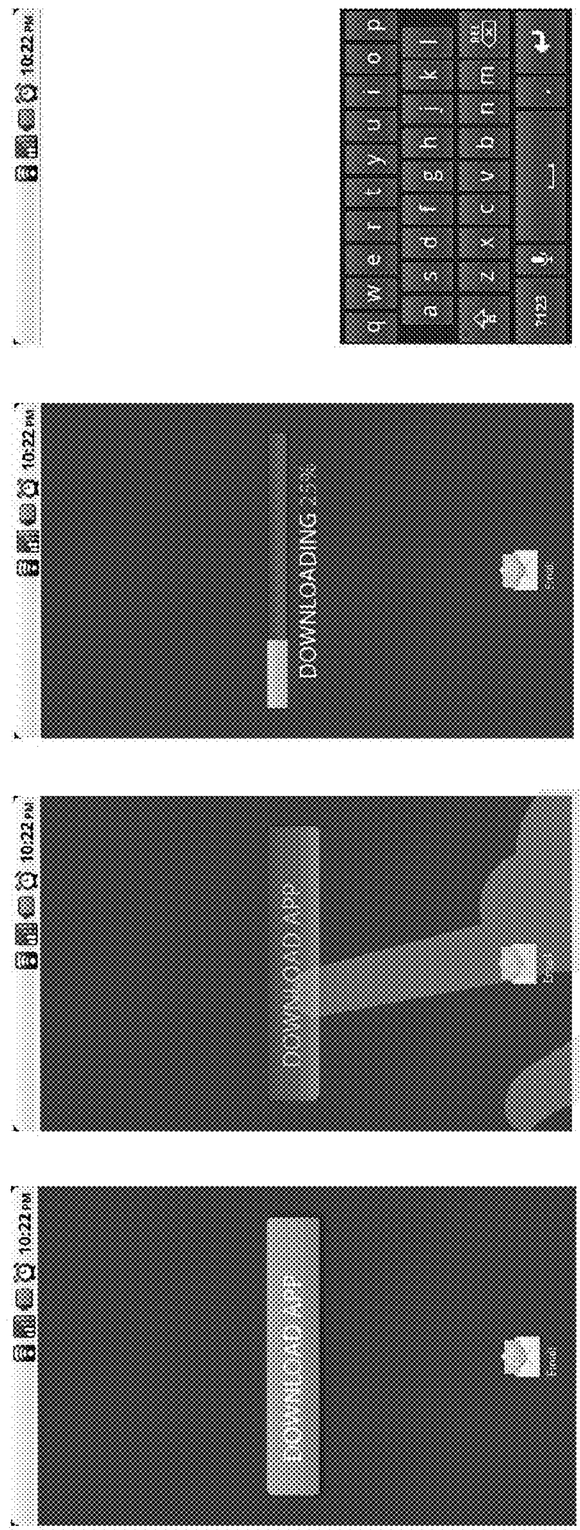
FIGS. 9A-9D are screen views of example foreground and background haptic applications according to one embodiment of the present invention.

FIGS. 9A-9D are screen views of example foreground and background haptic applications according to one embodiment of the present invention. It will be recognized that more than one haptic enabled software application may be running simultaneously on a device having a haptic actuator, and that a window on the top of a virtual windows environment may overlap or obscure portions of any windows that are on the bottom. FIG. 9A shows a screen view of an example application window having a virtual download application button located in the center of the screen. In FIG. 9B the user selects the download application button, whereupon FIG. 9C shows a new screen view having a status bar in the center of the screen which indicates the percentage completion of the download. The status bar changes color proportionally from left to right corresponding to the percentage completion text shown directly below the status bar. Because the status bar is haptified, a haptic effect signal is generated and output to the haptic actuator concurrently with the visual display of the status bar. In one embodiment, the haptic effect signal changes over time corresponding to the percentage completion of the download.

FIG. 9D shows a screen view of a text input window. The text input window, selected by the user as the active window, is running in the foreground and completely obscures the download application status bar which is running simultaneously in the background. Although the download application window is no longer the active window and the status bar is completely obscured on the visual display, the status bar haptic effect signal continues to be generated and output to the haptic actuator as a background haptic effect. Because the text input window is also haptified, a foreground haptic effect signal is generated and output to the haptic actuator for each typed character concurrently with the visual display of the typed character in the text input window. In one embodiment, the foreground and background haptic effect signals are combined, modified or synthesized in such a way that the user perceives the foreground and background haptic effects as being distinct haptic effects even though they are both being output concurrently via a single haptic actuator.

The perception of a haptic effect has three different levels. The first level is the threshold of perception, which is the minimum applied haptic effect signal component or components required for a user to detect the haptic effect. Such haptic components include, but are not limited to, strength, frequency, duration, rhythm and dynamics of the haptic effect signal. It will be recognized that the threshold of haptic perception may be highly non-linear and may vary greatly between users, and may even vary for a single user depending on many factors such as the user's sensitivity to touch, how tightly the user may be holding a handheld device, the ambient temperature, the user's age, or the user's physical activity or environment such as walking or riding in a vehicle, and so on.

The second level of haptic effect perception is the threshold of attention break-in, which is the minimum change in the applied haptic effect signal that results in drawing the user's attention away from the primary focus to the attention break-in haptic effect itself. It will be recognized that the threshold of attention break-in may vary between users or for a single user depending on many factors as described above, and may also vary depending on whether the attention break-in is related to various types of haptic effects including a positive additive effect, or a negative subtractive effect, or a change in the haptic effect. The third level of haptic effect perception is the threshold of pain, which also varies between users or for a single user depending on many factors as described above. It will be recognized that under some circumstances, the threshold of perception may be the same as the threshold of attention break-in, which may also be the same as the threshold of pain.

The present invention is compatible with a wide variety of haptic actuators, and can present multiple channels of haptic effect data with different intensity levels. In one embodiment, the multiple channels are represented by a foreground channel and one or more background channels. A background haptic effect is any haptic effect or haptic effect component which meets or exceeds the threshold of perception. A foreground haptic effect is any haptic effect or haptic effect component which meets or exceeds the threshold of attention break-in. In one embodiment, a foreground or background haptic effect may be a defined set of static or dynamic haptic effects or effect components. In another embodiment, a foreground or background haptic effect may be an adaptive set of static or dynamic haptic effects or haptic effect components in response to user input, system input, device sensor input or ambient input.

Using multiple haptic channels, such as foreground and background channels, enables subtle haptic effects to be provided concurrently with more obvious haptic effects, allowing a user to distinguish between the different effects and identifying them as originating from different sources. In one embodiment, low-importance or high-density information is perceivable, but not overwhelming or distracting from a primary task, and multiple channels further enable haptic ambient awareness. For example, a haptic enabled handheld or mobile device which is monitoring the local weather during a rainstorm activates a background haptic channel to provide a sensation of raindrops that increases or decreases as it rains harder or softer.

In one embodiment, foreground and background channels are used to distinguish the feedback originating from a local device and the feedback originating from another user. For example, a message notification arriving from another user activates a foreground haptic effect, while the status of a ticking clock on the local device activates a background haptic effect.

In one embodiment, foreground and background channels are used to distinguish the feedback originating from a local device and the feedback originating from a primary user. For example, the feedback originated by a primary user typing on a haptic enabled keyboard activates a foreground haptic effect, while the status of a progress bar on the local device activates a background haptic effect.

In one embodiment, foreground and background channels are used to distinguish the feedback within or between virtual simulations or animations. For example, the motion of a virtual rolling ball activates a foreground haptic effect, while the virtual texture the ball is rolling on activates a background haptic effect.

In one embodiment, background haptic effects are additive such that when multiple background effects are received concurrently or in quick succession, the overall result is a natural or gradual foregrounding of the haptic effects. For example, a single background text message "tweet" notification received from a non-primary user may be easily missed or ignored by the primary user, but when hundreds or thousands of message notifications constituting a "tweet storm" are received in a short amount of time, the multiple haptic effects add up and the overall result is a haptic experience in the foreground which draws the primary user's attention to the event.

In one embodiment, background haptic effects are used to provide non-distracting or "polite" augmentation of a commercial advertisement or any other type of haptic encoded content. For example, an advertisement for a carbonated soft drink provides a background haptic "fizz" effect that can be felt if the user is paying attention but otherwise can be easily ignored.

It will be recognized that any type of input such as user, device, system, application or network input may be represented by any number of haptic events on one or more foreground or background haptic channels. Examples include, but are not limited to, multi-tasking applications, incoming email, "tweet" message notifications, passive notifications, outgoing messages, progress bars, Bluetooth or local device pairings, network add or drop connection, continuous antenna signal level, and so on.

Figure 10A:
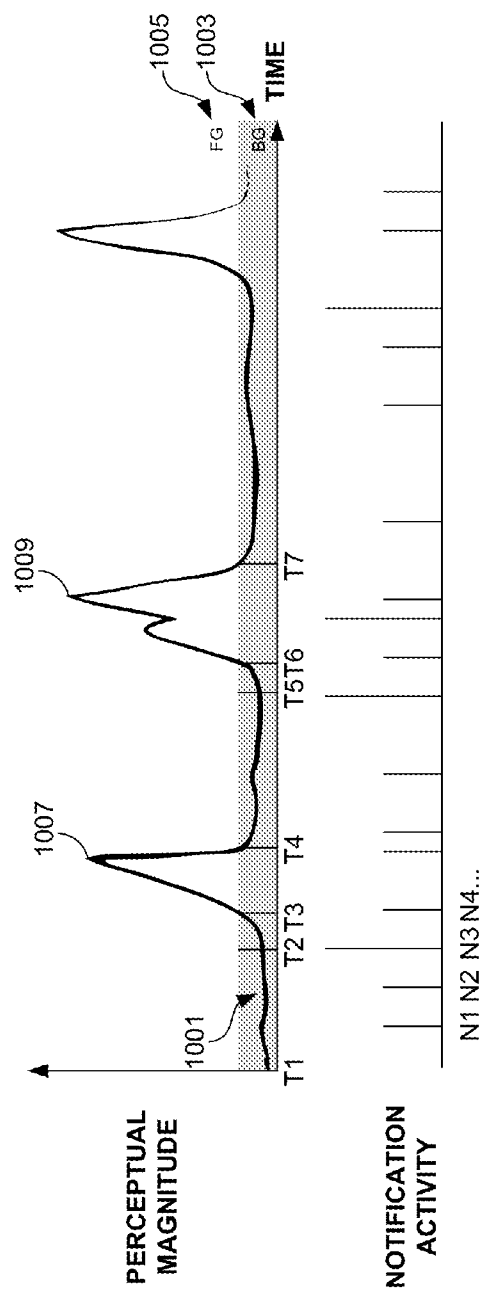
FIGS. 10A-10B are display graphs of example multiple data channels of haptic feedback according to one embodiment of the present invention.
Figure 10B:
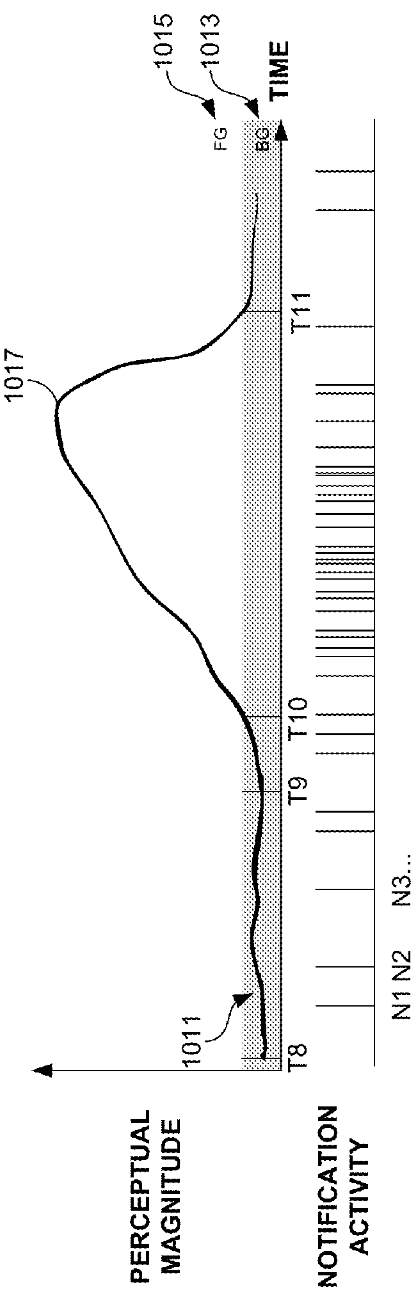

FIGS. 10A-10B are display graphs of example multiple data channels of haptic feedback according to one embodiment of the present invention. FIG. 10A shows a graph of the perceptual magnitude of a haptic signal over time for priority based haptic events, along with a corresponding graph of notification activity. At time T1, the perceptual magnitude of a haptic signal 1001 corresponding to the medium priority notifications N1 and N2 starts in the background channel 1003. Upon receipt of a high priority notification N3, at time T2 the haptic signal 1001 begins to rise until at time T3 the haptic signal 1001 crosses the threshold from the background channel 1003 into the foreground channel 1005. The haptic signal 1001 continues to increase up to a peak level 1007, where in the absence of any further notifications the haptic signal 1001 decreases and crosses the threshold from the foreground channel 1005 to the background channel 1003 at time T4.

At time T5, receipt of a high priority notification once again causes the haptic signal 1001 to rise until at time T6 the haptic signal crosses 1001 the threshold from the background channel 1003 into the foreground channel 1005. The haptic signal 1001 continues to increase up to a peak level 10010, where in the absence of any further notifications the haptic signal 1001 decreases and crosses the threshold from the foreground channel 1005 to the background channel 1003 at time T7. It will be recognized that a stream of low-priority or medium-priority notifications punctuated with high-priority notifications results in a haptic signal 1001 that shifts between the background channel 1003 and foreground channel 1005 without limitation.

FIG. 10B shows a graph of the perceptual magnitude of a haptic signal over time for frequency based haptic events, along with a corresponding graph of notification activity. At time T8, the perceptual magnitude of a haptic signal 1011 corresponding to the relatively infrequent notifications N1 through N3 starts in the background channel 1013. Upon receipt of higher frequency notifications, at time T9 the haptic signal 1011 begins to rise until at time T10 the haptic signal 1011 crosses the threshold from the background channel 1013 into the foreground channel 1015. With continuing receipt of higher frequency notifications, the haptic signal 1011 continues to increase up to a peak level 1017, where in the absence of any further notifications the haptic signal 1011 decreases and crosses the threshold from the foreground channel 1015 to the background channel 1013 at time T11. It will be recognized that a stream of low-frequency notifications punctuated with high-frequency notifications results in a haptic signal 1011 that shifts between the background channel 1013 and foreground channel 1015 without limitation. In one embodiment, priority based haptic events and frequency based haptic events may be interspersed with each other or received at any time or in any order, and may be used in any manner to generate an overall combined haptic signal.

Figure 11:
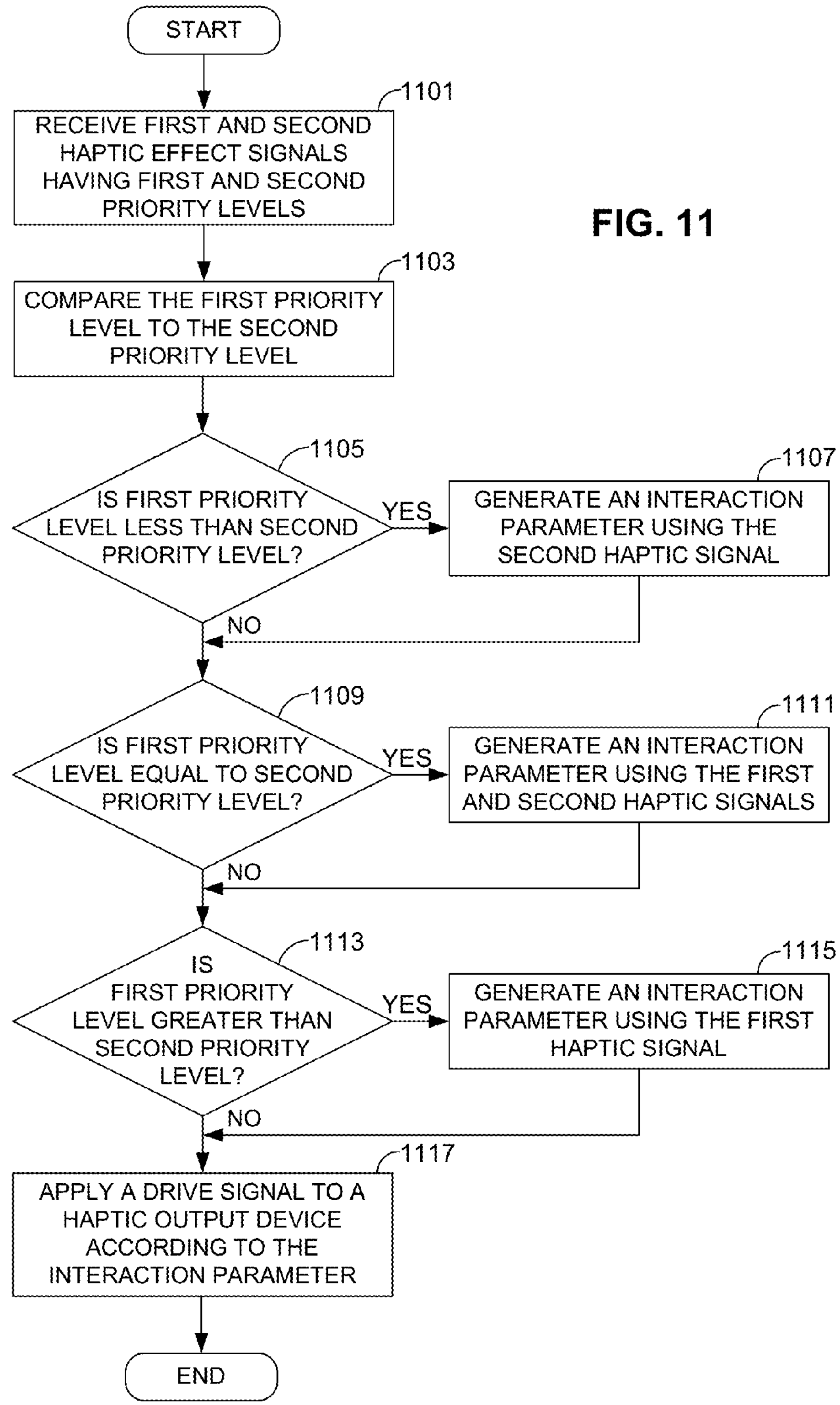
FIG. 11 is a flow diagram for displaying multiple data channels of haptic feedback for priority based haptic events according to one embodiment of the present invention.

FIG. 11 is a flow diagram for displaying multiple data channels of haptic feedback for priority based haptic events according to one embodiment of the present invention. In one embodiment, the functionality of the flow diagram of FIG. 11 is implemented by software stored in memory or other computer readable or tangible medium, and executed by a processor. In other embodiments, the functionality may be per-formed by hardware (e.g., through the use of an application specific integrated circuit ("ASIC"), a programmable gate array ("PGA"), a field programmable gate array ("FPGA"), etc.), or any combination of hardware and software.

At 1101, the system receives input of first and second haptic effect signals having first and second priority levels. It will be recognized that any type or number of priority levels may be used, such as foreground and background priority levels, or any number of alpha-numeric or any other sequential or non-sequential priority levels, without limitation. The first and second haptic effect signals may be received in any order or time sequence, either sequentially with non-overlapping time periods or in parallel with overlapping or concurrent time periods. At 1103, the system compares the first priority level to the second priority level. If at 1105 the first priority level is less than the second priority level, at 1107 an interaction parameter is generated using the second haptic signal. It will be recognized that any type of input synthesis method may be used to generate the interaction parameter from one or more haptic effect signals including, but not limited to, the method of synthesis examples listed in TABLE 1 below. If at 1109 the first priority level is equal to the second priority level, at 1111 an interaction parameter is generated using the second haptic signal. If at 1113 the first priority level is greater than the second priority level, at 1115 an interaction parameter is generated using the second haptic signal. At 1117, a drive signal is applied to a haptic actuator according to the interaction parameter.

TABLE 1

| METHODS OF SYNTHESIS |
|---|
| Additive synthesis—combining inputs, typically of varying amplitudes |
| Subtractive synthesis—filtering of complex signals or multiple signal inputs |
| Frequency modulation synthesis—modulating a carrier wave signal with one or more operators |
| Sampling—using recorded inputs as input sources subject to modification |
| Composite synthesis—using artificial and sampled inputs to establish a resultant "new" input |
| Phase distortion—altering the speed of waveforms stored in wavetables during playback |
| Waveshaping—intentional distortion of a signal to produce a modified result |
| Resynthesis—modification of digitally sampled inputs before playback |
| Granular synthesis—combining of several small input segments into a new input |
| Linear predictive coding—similar technique as used for speech synthesis |
| Direct digital synthesis—computer modification of generated waveforms |
| Wave sequencing—linear combinations of several small segments to create a new input |
| Vector synthesis—technique for fading between any number of different input sources |
| Physical modeling—mathematical equations of the physical characteristics of virtual motion |

Figure 12:
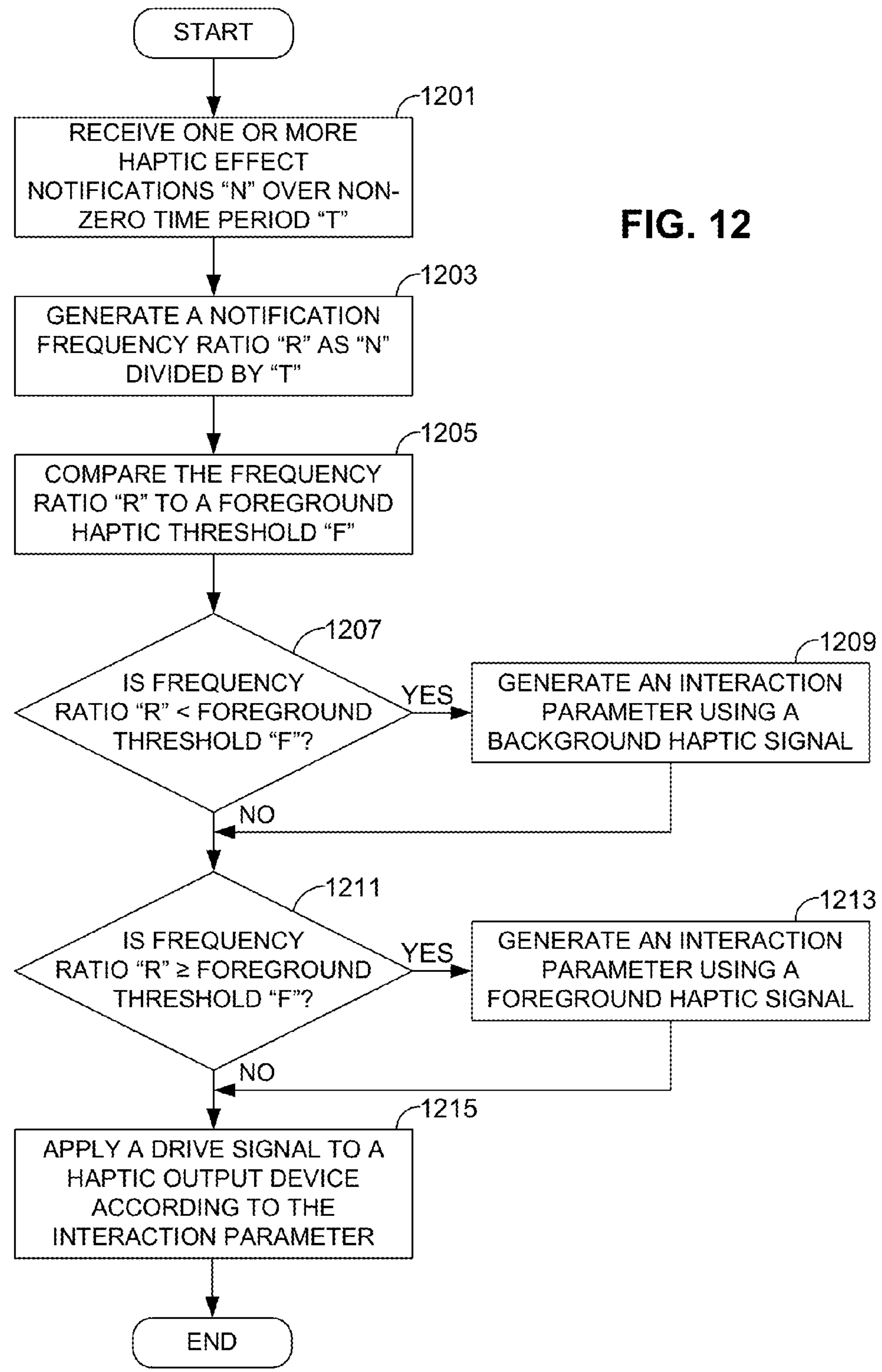
FIG. 12 is a flow diagram for displaying multiple data channels of haptic feedback for frequency based haptic events according to one embodiment of the present invention.

FIG. 12 is a flow diagram for displaying multiple data channels of haptic feedback for frequency based haptic events according to one embodiment of the present invention. At 1201, the system receives one or more haptic effect notifications N over a non-zero time period T. At 1203, the system generates a notification frequency ratio R, calculated by using at least the number of haptic effect notifications N and the non-zero time period T. In one embodiment, the notification frequency ratio R is calculated as N divided by T. At 1205, the system compares the notification frequency ratio R to a foreground haptic threshold F. Haptic threshold F may be static or dynamic and may vary over time depending on many factors such as the user's sensitivity to touch, how tightly the user may be holding a handheld device, the ambient temperature, the user's age, or the user's physical activity or environment such as walking or riding in a vehicle, and so on. It will be recognized that the notification frequency ratio R may be directly calculated or may be normalized corresponding to a wide range of variation for the haptic threshold F, and that the haptic threshold F may be directly calculated or may be normalized corresponding to a wide range of variation for the notification frequency ratio R.

If at 1207 the notification frequency ratio R is less than the foreground haptic threshold F, at 1209 an interaction parameter is generated using a background haptic signal. If at 1211 the notification frequency ratio R is greater than or equal to the foreground haptic threshold F, at 1213 an interaction parameter is generated using a foreground haptic signal. At 1215, a drive signal is applied to a haptic actuator according to the interaction parameter Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed:

1. A method of producing a haptic effect comprising:
receiving a first notification signal;
receiving a second notification signal;
generating a notification parameter using the first notification signal and the second notification signal;
comparing the notification parameter to a foreground haptic threshold;
if the notification parameter is greater than or equal to the foreground haptic threshold,
generating an interaction parameter using a foreground haptic effect signal;
if the notification parameter is less than the foreground haptic threshold, generating an interaction parameter using a background haptic effect signal; and
applying a drive signal to a haptic output device according to the interaction parameter; and further comprising:
receiving a plurality of haptic effect notifications N over a time period T;
generating a notification frequency ratio using N and T;
comparing the notification frequency ratio to the foreground haptic threshold;
if the notification frequency ratio is less than the foreground haptic threshold, generating an interaction parameter using the background haptic effect signal;
if the notification frequency ratio is greater than or equal to the foreground haptic threshold, generating an interaction parameter using the foreground haptic effect signal; and
applying a drive signal to the haptic output device according to the interaction parameter.

2. The method of claim 1, wherein the foreground haptic effect signal or the background haptic effect signal comprises a haptic effect signal selected from the list consisting of strength, frequency, duration, rhythm or dynamics.

3. The method of claim 1 further comprising generating the notification frequency ratio as N divided by T.

4. The method of claim 1, wherein the foreground haptic effect signal or the background haptic effect signal comprises a haptic effect signal selected from the list consisting of strength, frequency, duration, rhythm or dynamics.

5. The method of claim 1, further comprising: receiving a priority based haptic effect signal having a priority level; and generating the interaction parameter using the priority based haptic effect signal combined with the priority level and the plurality of haptic effect notifications N.

6. A haptic effect enabled system comprising:

a haptic output device;

a drive module electronically coupled to the haptic output device for receiving a first haptic effect signal having a first priority level and a second haptic effect signal having a second priority level, and generating a dynamic interaction parameter using the first haptic effect signal combined with the first priority level and the second haptic effect signal combined with the second priority level; and a drive circuit electronically coupled to the drive module and the haptic output device for applying a drive signal to the haptic output device according to the dynamic interaction parameter;

wherein the drive module comprises a drive module for receiving a plurality of haptic effect notifications N over a time period T, and generating an interaction parameter using a notification frequency ratio using N and T; and wherein the drive module comprises a drive module for comparing the notification frequency ratio to a foreground haptic threshold;

if the notification frequency ratio is less than the foreground haptic threshold, generating the interaction parameter using a background haptic effect signal; and if the notification frequency ratio is greater than or equal to the foreground haptic threshold, generating the interaction parameter using a foreground haptic effect signal.

7. The system of claim 6 wherein the drive module comprises a drive module for comparing the first priority level to the second priority level;

if the first priority level is less than the second priority level, generating the dynamic interaction parameter using the second haptic effect signal;

if the first priority level is equal to the second priority level, generating the dynamic interaction parameter using the first haptic effect signal and the second haptic effect signal; and if the first priority level is greater than the second priority level, generating the dynamic interaction parameter using the first haptic effect signal.

8. The system of claim 6, wherein the first haptic effect signal or the second haptic effect signal comprises a haptic effect signal selected from the list consisting of strength, frequency, duration, rhythm or dynamics.

9. The system of claim 6, wherein the first priority level or the second priority level comprises a priority level selected from the list consisting of foreground, background or alphanumeric.

10. The system of claim 6 further comprising a drive module for generating the notification frequency ratio as N divided by T.

11. The system of claim 6, wherein the foreground haptic effect signal or the background haptic effect signal comprises a haptic effect signal selected from the list consisting of strength, frequency, duration, rhythm or dynamics.

12. The system of claim 6, further comprising: a drive module for receiving a priority based haptic effect signal having a priority level, and generating the interaction parameter using the priority based haptic effect signal combined with the priority level and the plurality of haptic effect notifications N.

* * * * *